Figure 1:
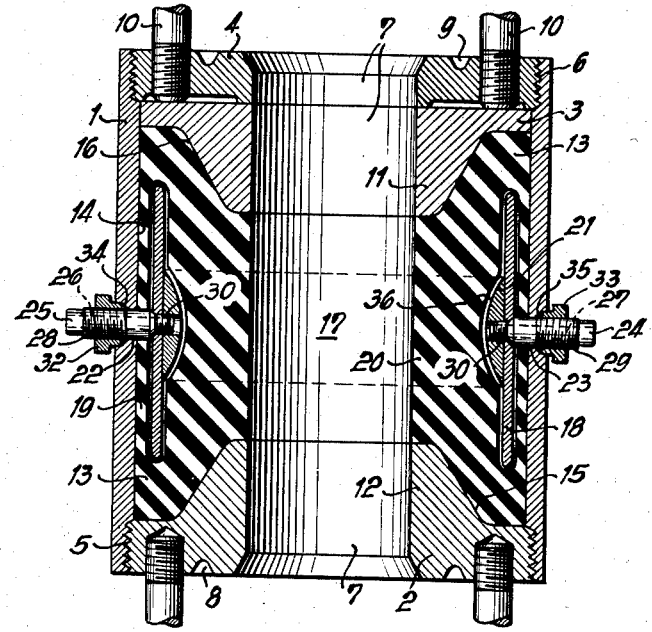

July 15, 1958 — O. MEYER — 2,843,349
PRESSURE FLUID OPERATED BLOWOUT PREVENTER
Filed Dec. 27, 1954

INVENTOR
OTTO MEYER
BY

# United States Patent Office 2,843,349
Patented July 15, 1958

2,843,349

PRESSURE FLUID OPERATED BLOWOUT PREVENTER

Otto Meyer, Ehlershausen uber Lehrte, Germany

Application December 27, 1954, Serial No. 477,849

Claims priority, application Germany January 4, 1954

3 Claims. (Cl. 251—2)

The invention relates to a valve and its operating means for pipings of all kinds, e. g. in the petroleum hauling, acid industry, dairies and the like.

Preferably the invention is an improvement in the preventer group, which is the expression for valves arranged in the bore-holes for petroleum. In these bore-holes high pressures may arise, when petroleum or gas want to leave the bore-hole at high pressure and are prevented by the valve. It is known to equip those valves with an insertion of a short cylindrical rubber hose. As long as the boring-rod is in the bore-hole, the cylindrical hose-piece is only so much deformed when it is closed that it embraces strongly the boring-rod to rest thereupon. If, however, the boring rod is missing, the hole aperture which was formerly filled out by the rod must completely be sealed off. In this case it may happen that the force of the petroleum or the gases is so great that the hose-piece is torn off at its free ends where it is clamped to the valve-housing and is blown out like a prop.

It is already known to form the hose-like insertion on its periphery with flanges which are dove tail in cross-section, being secured between conical-shaped cover and plug within the housing of the valve to hold the hose-like insertion in its proper position. However, this arrangement has merely been used in valves, the diameter of the passage of which is smaller than the diameter of the associated pipes. Moreover, it may happen in these known arrangements that the pressure medium which is used to deform the insertion, may leak into the pipe line, or that the conveyed medium may penetrate in the space in which the pressure for the sleeve is located.

In the embodiment of a valve especially preventer according to the invention these disadvantages are overcome so that once the elastic sleeve may be made with a greater inner diameter corresponding to the inner diameter of the pipe line, and secondly the medium conveyed through the pipe line is completely separated from the medium operating the sleeve.

According to the invention, the sleeve of elastic material having a cylindrical outer surface, bears against the inner surface of the housing of the valve and has within its body a cylindrical circular cavity. Within this circular cavity a bush of solid material especially of metal for reinforcement is located. Additionally, the bush holds the elastic sleeve against the inner surface of the wall of the housing. Preferably, the bush is reinforced in the centre of its inner surface by a ring, the edges of which are rounded off. The pressure medium is conveyed into the cavity through in- and outlet sockets which are formed through the cylindrical bush and are additionally used to hold the bush relative to the housing. Preferably, the in- and outlet sockets are screwed into the bush and are led through openings in the wall of the housing and through the outer part of the elastic sleeve. On the outside of the valve a nut is screwed on the sockets whereby the sleeve and the outer cylindrical part of the elastic sleeve are forced against the wall of the housing. Between housing wall and nut a gasket is provided.

Security against destruction of the elastic sleeve through the pressure of the medium in the pipe line still may be increased in that preferably the end faces of the elastic sleeve are made harder than the centre zone thereof by choosing a suitable rubber composition or by vulcanisation.

To close the preventer a considerably higher pressure is required in the hose-like insertion than the pressure of the medium flowing in the piping or of the medium to be shut off by the preventer. In the petroleum industry especially in the boring probes often very high and different pressures arise, and difficulties exist at very high pressures in the flow-passages to have the required medium for this pressure at a still higher pressure at hand to fill the hose-like elastic insertion.

According to the invention, this difficulty is overcome in that the medium flowing through the flow-passage is conveyed to a pressure converter which converts the pressure of the pipe line into the required higher pressure which is conveyed through a further piping and through the inlet socket into the inner cavity of the elastic insertion. The pressure converter may be e. g. a two-stage piston; upon its greater piston area, the pressure of the pipe line is directed by interposing a valve. The smaller piston provides the increased pressure for the inner cavity of the preventer.

Figure 2:
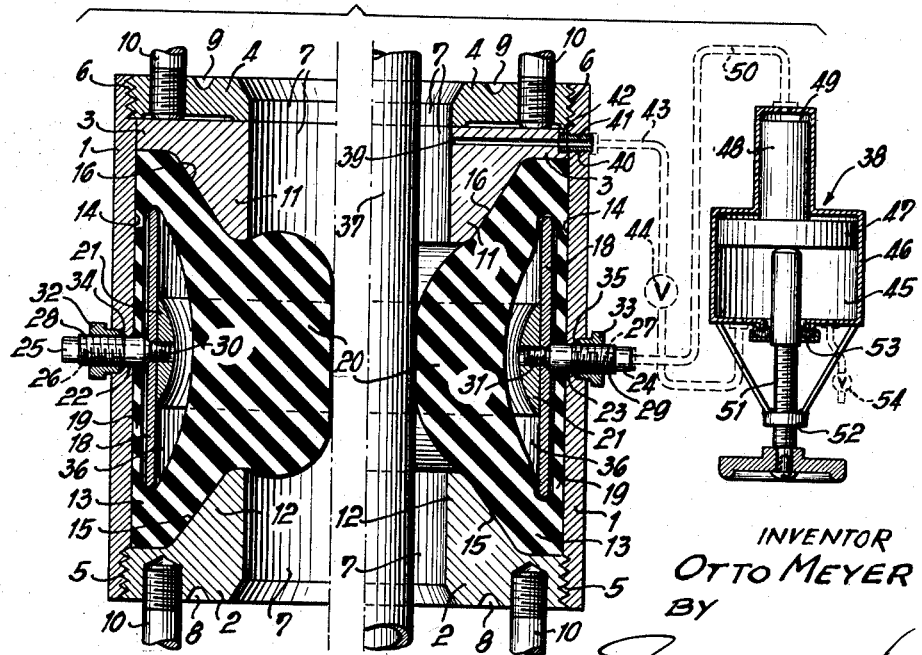

The invention will now be described by way of example with respect to the accompanying drawing in which:

Fig. 1 shows a valve preferably a preventer in its opened position in longitudinal section, and Fig. 2 shows a valve according to Fig. 1 in the same section, however in shut position. The left-hand side of the section shows a shut valve with free flow-passage and the right-hand side a valve with a rod extending through its flow-passage, also in shut position, whereby the shutting pressure is obtained from a pressure converter.

A cylindrical housing bush 1 has on its one end a covering flange 2 which is screwed into the bush by means of a thread 5. On the other end of the bush a covering flange 3 is provided which is pushed into the bush 1 and is held therein by means of a lid 4 having a thread 6 screwed into the bush. The covering flanges 2, 3 and the lid 4 have passage openings 7 and the flanges 2 and 4 are arranged for connection to the pipe-line. On their outer front faces circular grooves 8 and 9 as well as threaded bolts 10 are provided. The circular grooves are provided to take up gaskets, and the threaded bolts 10 for attachment of the counter flanges which are secured to the not shown pipes. The covering flanges 2 and 3 have on their inner face centrical projections in the form of truncated cones 11 and 12 which project inwards into the housing bush 1. The housing bush 1 has inside an elastic insertion 13 which is preferably made of rubber and which extends between the two covering flanges 2 and 3 and bears in all its parts readily against the inner surface 14 of the housing bush 1 as well as against the inner surfaces 15, 16 of the truncated cones of the covering flanges 2 and 3. The elastic insertion may be secured by vulcanization in the housing of the valve or it may be inserted afterwards into the housing and not connected thereto by vulcanization. The circular parts of the elastic insertion adjacent to the covering flanges are more vulcanized than the circular centre part thereof. The elastic insertion 13 has also an axial tube-like passage 17 which is in smooth communication with the openings 7 in the flanges. A circular cylindrical bush 18 of metal is imbedded in the elastic insertion axially to the flow-passage 13, however, is not vulcanized thereto. The bush 18 is in all its parts surrounded by the elastic insertion 13, so that a cavity 36 is formed in the insertion which is nearly completely filled out in the opened state of the valve by the bush 18. Between the cylindrical outer surface of the bush 18 and the inner surface 14 of the housing bush 1 only a thin layer 19 of the elastic insertion is left. But between the cylindrical inner surface of the bush 18 and the tubular flow-passage 17, a thick cylindrical sleeve 20 of the elastic insertion 13 is formed. The bush 18 is made as long as possible, however, it has been carefully checked that between its ends and the inner surface 15, 16 of the flanges 2 and 3 a sufficient wide part of the elastic insertion is present which is strong enough to take up the load when the valve is shut with sufficient safety. The bush 18 has in the middle of its cylindrical inner surface a circular re-inforcement 21 which is made in the shown example by welding to the bush. The housing bush 1 has in its middle radially extending holes 22, 23 which pass through the layer 19 of the elastic insertion 13. Through these holes 22, 23 inlet and outlet sockets 24, 25 are pushed which have axial flow-passages 26, 27 and on their ends and outside thereof threads 28, 30 or 29, 31. The ends of the inlet and outlet sockets 24, 25 pushed in the housing bush 1, are screwed into threaded holes formed in the bush 18 or in the circular re-inforcement 21. By means of nuts 32, 33 which bear from outside by interposing gaskets 34, 35 against the housing bush 1, the bush 18 is pressed against the thin layer 19 of the elastic insertion and this in turn against the inner surface 14 of the housing bush 1, so that a sealing of the hole 22 is effected by the thin elastic layer 19. Further blind sockets may be used to secure the bush 18 which in the same way as the inlet and outlet sockets form a further connection between the bush 18 and the housing bush 1.

When the outlet duct (not shown) connected to the outlet socket, is shut off and a liquid or gaseous pressure medium is forced through the inlet socket into the cavity 36 of the elastic insertion, the elastic insertion expands as shown in Fig. 2 of the drawing. The elastic insertion thus is forced against the inner surface 14 of the housing bush 1 and the inner surfaces 15 and 16 of the covering flanges 2 and 3 so that it is properly supported within the housing. This support is increased in that the inner surfaces of the covering flanges 2 and 3 are equipped with truncated cone projections 11, 12 against which the circular end parts of the elastic insertion bear as against a shoulder, and in that the circular end parts additionally have a greater Scleroscope hardness as well as the support which is given through the bush 18. Merely the cylindrical sleeve 20 of the elastic insertion between the bush 18 and the tubular flow-passage 17 may yield under the pressure in the cavity and expanse in direction of the flow-passage so that it is throttled and finally shut. This state is shown in Fig. 2. On the left-hand side of the centre line of the drawing a valve is shown in shut position in which the tubular flow-passage 17 is completely shut by means of the elastic insertion whereas on the right-hand side of the centre-line of the drawing a valve is shown in which the elastic insertion engages a rod 37 located in the flow-passage 17 whereby also a proper sealing of the flow-passage is achieved. In the embodiment according to the invention it is not possible that the elastic insertion is so deformed that it is torn out of the housing by the pressure in a pipe and shut valve.

When the pressure in the cavity 36 is let off through the outlet socket 25, the elastic insertion contracts so that a completely smooth tubular passage 17 is obtained again.

According to the invention the pressure medium for the cavity 36 of the elastic insertion 13 may be supplied from a pressure converter 38. The pressure medium operating the pressure converter is derived from the flow-passage before the valve, seen in direction of the flow. For this purpose the covering flange 3 may have, as shown in Fig. 2, a duct 39 which leads to the hole 40 in the housing bush 1. In the hole 40 or in the duct 39 a socket 41 is screwed by interposing a gasket 42. As indicated by the broken line, a duct 43 having a valve 44 leads to the cylinder 45 which is formed by the housing 46 of the pressure converter 38. When the valve 44 is open, the pressure existing in the flow-passage 7 is brought upon the greater piston 47 of the two-step pressure converter whereby the smaller piston 48 of the pressure converter is operated, and the pressure medium contained in the smaller cylinder 49, is forced through the duct 50 (indicated by the broken lines) into the inlet socket 24 and therethrough into the cavity 36 of the elastic insertion. The pressure in the flow-passage 7 is converted into a higher pressure through the rate of the areas of the greater piston 47 to the smaller piston 48 of the pressure converter 38. The rate is such that in any case a proper sealing of the valve is obtained. To open the valve, the valve 44 is shut and the pressure medium contained in the cylinder 45 is drained through the valve 54. By means of the pressure in the flow-passage and the tension of the elastic insertion, the pressure medium contained in the cavity 36 is forced back through the duct 50 into the cylinder 49. If the return force is not sufficient, the pistons of the pressure converter may be provided with a return spring. If the valve is to be shut without a sufficient pressure prevailing in the duct 7, the pistons of the pressure converter may be operated by a spindle 51 which is provided with thread and engaging a nut 52 arranged undisplaceably. A gasket 53 prevents the penetration of pressure medium out of the cylinder 45. If the end of the spindle 51 merely bears against the piston 47, that means, is in engagement with the piston only in pushing direction, the piston 47 of the pressure converter may be additionally engaged by the pressure prevailing in the flow-passage 7. As the throttling of the valve when the pressure converter is operated by hand, produces a stowing effect in the flow-passage, the pressure prevailing in the cylinder 45 rapidly increases, whereby the further shutting of the valve takes place. Merely by a small operation of the spindle 51 a safe and quick shutting of the valve may be obtained, whereby the pressure prevailing in the cavity 36 of the elastic insertion has with regard to the transmission rate of the pressure converter a respective higher pressure than the momentary pressure in the flow-passage of the valve.

I claim:

1. A valve adapted to be disposed in a pipe line, comprising a tubular housing, a generally cylindrical insert disposed within said housing and formed of elastic material with the inner surface thereof providing an axial flow passage through the valve, said insert having an endless cavity formed in the body thereof in surrounding relation to the flow passage therethrough, means for supplying pressurized fluid to the cavity to expand the same and deform the inner surface of the insert inwardly to constrict the passage therethrough, a pair of cover flanges secured at opposite ends of said housing to retain said insert therein, each of said flanges having an opening therethrough coaxial with said passage, the opposed inner faces of said flanges having frusto-conical projections to confine deformation of said insert due to expansion of said cavity to an area on the inner surface thereof intermediate the ends of such insert, said insert being formed to conform to the shape defined by the inner surface of said housing and the inner faces of said flanges and to snugly bear against such surfaces when the cavity is collapsed, the ends of said insert bearing against the inner faces of said flanges being of greater Shore hardness than the deformable inner surface portion of the insert, and a two-step pressure converter connected with its low-pressure side through a duct to the flow-passage downstream of the valve, and with its high-pressure side through a duct with said cavity.

2. A valve according to claim 1 characterized in that the pressure converter is formed by two pistons of different size which are rigidly connected to each other.

3. A valve according to claim 2 characterized in that the piston of the pressure converter is displaceable by means of a spindle located axially to the piston.

References Cited in the file of this patent

UNITED STATES PATENTS

| | | |
|---|---|---|
| 1,772,210 | Dale | Aug. 5, 1930 |
| 1,896,673 | Kopsa | Feb. 7, 1933 |
| 2,518,625 | Langstaff | Aug. 15, 1950 |
| 2,577,613 | Friberg | Dec. 4, 1951 |
| 2,622,619 | Grove | Dec. 23, 1952 |
| 2,746,709 | Minor | May 22, 1956 |
| 2,766,765 | Bolanowski | Oct. 16, 1956 |

FOREIGN PATENTS

| | | |
|---|---|---|
| 210,521 | Great Britain | Feb. 1, 1924 |
| 79,565 | Norway | Dec. 31, 1951 |